US012478983B2

(12) United States Patent
Aoki

(10) Patent No.: US 12,478,983 B2
(45) Date of Patent: Nov. 25, 2025

(54) CENTRIFUGAL FIELD-FLOW FRACTIONATION DEVICE

(71) Applicant: SHIMADZU CORPORATION, Kyoto (JP)

(72) Inventor: Kengo Aoki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 684 days.

(21) Appl. No.: 17/791,822

(22) PCT Filed: Dec. 24, 2020

(86) PCT No.: PCT/JP2020/048424
§ 371 (c)(1),
(2) Date: Jul. 8, 2022

(87) PCT Pub. No.: WO2021/140935
PCT Pub. Date: Jul. 15, 2021

(65) Prior Publication Data
US 2023/0034246 A1 Feb. 2, 2023

(30) Foreign Application Priority Data
Jan. 9, 2020 (JP) .................................. 2020-002310

(51) Int. Cl.
*B04B 7/06* (2006.01)
*B04B 15/00* (2006.01)
(Continued)

(52) U.S. Cl.
CPC ................ *B04B 7/06* (2013.01); *B04B 15/00* (2013.01); *G01N 15/0255* (2013.01);
(Continued)

(58) Field of Classification Search
CPC ..... B04B 7/06; B04B 15/00; B04B 2007/065; B04B 5/00; B04B 7/02; B04B 7/04;
(Continued)

(56) References Cited

U.S. PATENT DOCUMENTS

2014/0296051 A1* 10/2014 Kusumoto ................ B04B 7/06
494/12

FOREIGN PATENT DOCUMENTS

EP    2 524 733 A1    11/2012
JP    6477112 B2 *   3/2019

OTHER PUBLICATIONS

Written Opinion by the International Search Authority for PCT application No. PCT/JP2020/048424 dated Feb. 22, 2021, submitted with a partial machine translation.

* cited by examiner

*Primary Examiner* — Duane Smith
*Assistant Examiner* — Shuyi S. Liu
(74) *Attorney, Agent, or Firm* — Muir Patent Law, PLLC

(57) ABSTRACT

A centrifugal field-flow fractionation device includes: a rotor having a rotation axis, the rotor being provided to be rotatable about the rotation axis; a cover covering the rotor; a protective member arranged inside the cover to over the rotor about the rotation axis; a shock-absorbing member arranged between the protective member and the cover; and a fixing part provided in a breakable manner to fix the protective member to the cover. The rotor is arranged such that the rotation axis orients in a horizontal direction. In a case where a part of the rotor disintegrates and is brought into contact with the protective member during the rotation of the rotor, the fixing part breaks to cause the protective (Continued)

member and the shock-absorbing member to move with the rotor while receiving the impact of the rotor to buffer the kinetic energy of the rotor.

7 Claims, 6 Drawing Sheets

(51) Int. Cl.
*G01N 15/02* (2024.01)
*G01N 15/00* (2006.01)
(52) U.S. Cl.
CPC .................. *B04B 2007/065* (2013.01); *G01N 2015/0053* (2013.01); *G01N 2015/0288* (2013.01)
(58) Field of Classification Search
CPC ....... G01N 15/0255; G01N 2015/0053; G01N 2015/0288; G01N 2030/202; G01N 30/0005; B03B 5/28
USPC ..................................................... 494/12, 81
See application file for complete search history.

CENTRIFUGAL FIELD-FLOW FRACTIONATION DEVICE

TECHNICAL FIELD

The present disclosure relates to a centrifugal field-flow fractionation device provided with a rotatably mounted rotor.

BACKGROUND ART

As a method of classifying particles contained in a liquid sample according to the size and the specific gravity, a field-flow fractionation is known. For example, European Patent Application Publication No. 2524733 (hereinafter referred to as "Patent Document 1") discloses an example of a centrifugal field-flow fractionation device in which a liquid sample is introduced into a flow path and the flow path is rotated to classify the particles in the liquid sample by a centrifugal force.

The centrifugal field-flow fractionation device disclosed in Patent Document 1 is provided with a rotor that rotates about a shaft and a cover provided around the rotor. The cover has an inverted U-shape and is fixed to a base unit with the curved portion faced upward. The cover is made of a metallic material and prevents some of the parts of the rotor from being scattered outside the device when the rotor disintegrates.

PRIOR ART DOCUMENT

Patent Document

Patent Document 1: European Patent Application Publication No. 2524733

SUMMARY OF THE INVENTION

Problems to be Solved by the Invention

In a centrifugal field-flow fractionation device, the kinetic energy of the rotor increases when the centrifugal acceleration of the rotor is increased in order to improve the performance of the lower limit of the classification, etc. In a case where the rotor disintegrates due to the centrifugal force, some parts of the disintegrated rotor collide against the cover in a state in which the energy is large. In such cases, there is a concern that the cover is severely damaged.

Further, in a case where a part of the disintegrated rotor collides against the cover in a state in which the energy is large, the rotational force of the rotor is transmitted to the system main body equipped with the device. In particular, in a case where the rotation axis of the rotor orients in the horizontal direction, the rotating force in the same direction as the rotor rotating direction is transmitted to the system main body, which may cause the overturning of the system body.

The present disclosure has been made in view of the above-mentioned problems. It is an object of the present disclosure to provide a centrifugal field-flow fractionation device capable of improving safety.

Means for Solving the Problem

A centrifugal field-flow fractionation device according to the present disclosure is provided with: a rotor having a rotation axis, the rotor being provided to be rotatable about the rotation axis; a cover configured to cover the rotor; a protective member arranged on an inner side of the cover, the protective member that covers the rotor about the rotation axis; a shock-absorbing member arranged between the protective member and the cover; and a fixing part provided in a breakable manner, the fixing part fixing the protective member to the cover. The rotor is arranged such that the rotation axis orients in a horizontal direction. In a case where a part of the rotor disintegrates and is brought into contact with the protective member during the rotation of the rotor, the fixing part breaks to allow the protective member and the shock-absorbing member to be movable together with the rotor while receiving impact of the rotor to buffer kinetic energy of the rotor.

According to the above-described configuration, even in a case where the rotation axis of the rotor is horizontally oriented, by using the fixing part as described above, it is possible to fix the protective member and the shock-absorbing member so as not to be brought into contact with the rotor under the normal condition.

Further, in a case where a part of the rotor disintegrates during the rotation of the rotor at high speed, the part of the rotor collides against the protective member in a state in which the kinetic energy is high while maintaining the rotating state. At this time, the impact including the rotational force of the rotor is inputted to the protective member. Here, the fixing part for fixing the protective member is provided in a breakable manner, and therefore, the fixing part breaks due to the impact inputted to the protective member. This causes the protective member and the shock-absorbing member to rotate while being deformed due to the impact from the rotor.

The kinetic energy of the disintegrated rotor can be consumed by the deformation of the protective member and the shock-absorbing member. Therefore, even in a case where the rotor pushes the protective member and the shock-absorbing member toward the cover, it is possible to suppress the damage of the cover.

Further, as the protective member and the shock-absorbing member rotate, the rotational force of the disintegrated rotor is also consumed, thereby preventing the direct input of the rotational force of the rotor to the cover. In particular, in a case where the rotation axis of the rotor is oriented horizontally, the rotating force in the same direction as the rotor rotation direction is applied. Since such a direct input of the rotational force to the cover can be prevented, it is also possible to prevent the overturning of the system provided with the centrifugal field-flow fractionation device.

As described above, in the above-described centrifugal field-flow fractionation device, the breakage of the cover can be suppressed, and the overturning of the system provided with the device can be prevented, and therefore, the safety can be improved.

Effects of the Invention

According to the present disclosure, it is possible to provide a centrifugal field-flow fractionation device capable of improving safety.

EMBODIMENTS FOR CARRYING OUT THE INVENTION

Figure 1:
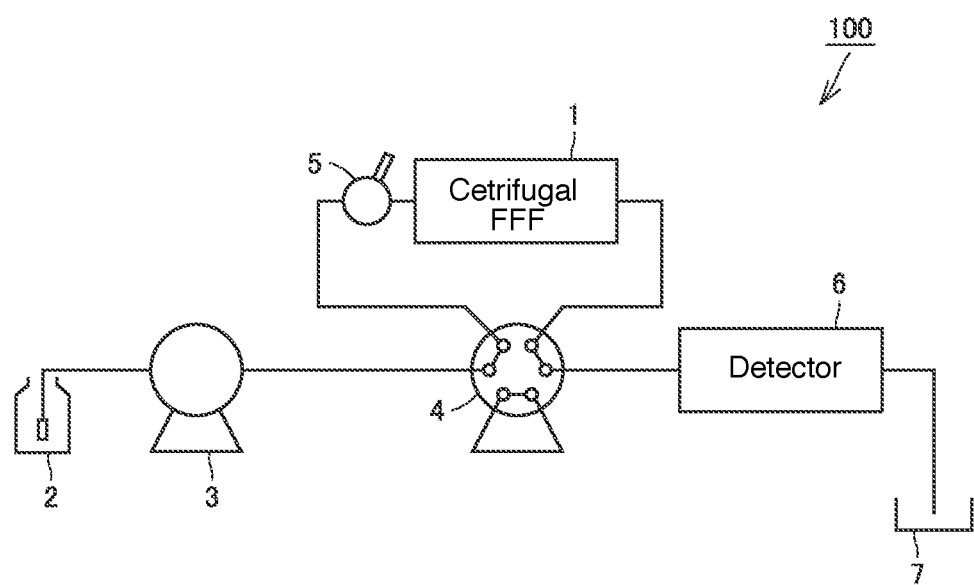
FIG. 1 is a schematic diagram showing a configuration of an analysis system according to Embodiment 1.

Hereinafter, some embodiments of the present disclosure will be described in detail with reference to the attached drawings. In the following embodiments, the same or common portion is assigned by the same reference symbol in the drawings, and the description thereof will not be repeated.

Embodiment 1

FIG. 1 is a schematic diagram showing a configuration of an analysis system according to Embodiment 1. With reference to FIG. 1, an analysis system 100 according to Embodiment 1 will be described.

As shown in FIG. 1, the analysis system 100 is provided with a centrifugal field-flow fractionation device 1, a carrier reservoir 2, a liquid-feeding pump 3, a rotary valve 4, a sample injection device 5, a detector 6, and a carrier recovery portion 7.

The centrifugal field-flow fractionation device 1 is a device for classifying particles contained in a liquid sample in accordance with the specific gravity using a flow field fractionation.

In the carrier reservoir 2, a carrier fluid composed of, for example, water or an organic solvent is stored. The carrier fluid is sent out from the carrier reservoir 2 by the liquid-feeding pump 3 to be supplied to the centrifugal field-flow fractionation device 1 via the rotary valve 4. The sample injection device 5 is provided between the rotary valve 4 and the centrifugal field-flow fractionation device 1. The carrier fluid into which a sample has been injected from the sample injection device 5 is supplied as a liquid sample to the centrifugal field-flow fractionation device 1. However, the sample injection device 5 may be provided between the pump 3 and the rotary valve 4.

The liquid sample contains a large number of particles to be analyzed. The particles contained in the liquid sample are classified by being applied by the centrifugal force in the centrifugal field-flow fractionation device 1 and flow out of the centrifugal field-flow fractionation device 1 at different timings in accordance with the specific gravity. The particles sequentially flowing out of the centrifugal field-flow fractionation device 1 are sent to the detector 6 together with the carrier fluid via the rotary valve 4, detected by the detector 6, and then recovered by the carrier recovery portion 7. Starting or stopping the supply of the liquid sample to the centrifugal field-flow fractionation device 1 can be switched by rotating the rotary valve 4.

Figure 2:
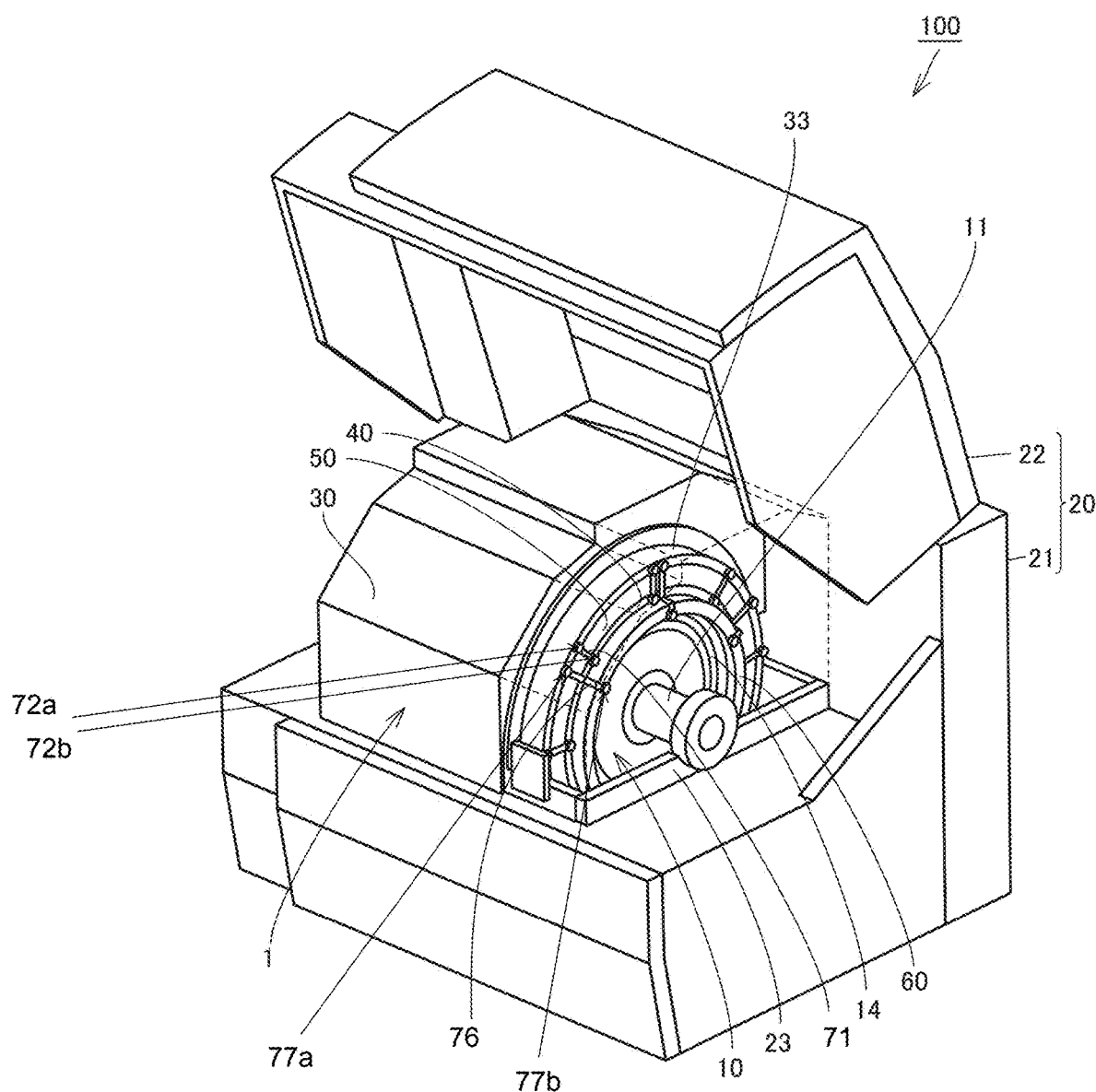
FIG. 2 is a schematic perspective view schematically showing the analysis system according to Embodiment 1.

FIG. 2 is a schematic diagram schematically showing the analysis system according to Embodiment 1. In FIG. 2, for convenience, a part of the cover 30, which will be described later, is indicated by a broken line. Referring to FIG. 2, the analysis system 100 and the centrifugal field-flow fractionation device 1 will be described.

As shown in FIG. 2, the analysis system 100 is provided with a housing 20 for accommodating the centrifugal field-flow fractionation device 1. The housing 20 is provided with a base unit 21 and an upper side case 22, the upper side case 22 being provided in an openable manner with respect to the base unit 21.

The centrifugal field-flow fractionation device 1 is fixed to the base unit 21. The centrifugal field-flow fractionation device 1 includes: a rotary shaft 11; a rotary unit 10 having a rotation axis L (see FIG. 3); a cover 30; a protective member 40; a shock-absorbing member 50; a leaked liquid recovery tray 60; a fixing part 70; and a tray fixing part 75.

The rotary shaft 11 is provided to extend horizontally. The rotary shaft 11 is rotatably held by the holding unit 23 provided in the base unit 21. To the rotary shaft 11, the rotary unit 10 is fixed. The rotary unit 10 rotates about the rotation axis L (see FIG. 3) in accordance with the rotation of the rotary shaft 11.

The rotary shaft 11 is formed in a hollow shape. A liquid sample is supplied to the inside of the rotary shaft 11 from, for example, one end of the rotary shaft 11. The rotary unit 10 is provided with an inlet 12 (see FIG. 3) into which the unclassified liquid sample is introduced and an outlet 13 (see FIG. 3) from which the classified liquid sample is outputted.

The inlet 12 and the outlet 13 communicate with the inside of the rotary shaft 11 via respective piping (not shown). With this, the liquid sample supplied into the rotary shaft 11 is introduced from the inlet 12 via the piping to the rotary unit 10, guided to the rotary shaft 11 from the outlet 13 via the piping after the particles in the sample fluid are classified in the rotary unit 10, and sent to the detector 6.

To the rotary shaft 11, a motor (not shown), which is an exemplary rotation drive unit, is connected. By driving the motor, the rotary unit 10 can be rotated to apply the centrifugal force to the liquid sample in the rotary unit 10. The driving of the motor is controlled by a controller (not shown) including, for example, a CPU (Central Processing Unit). However, the rotary unit 10 can also be rotated using a rotation drive unit other than a motor.

Figure 3:
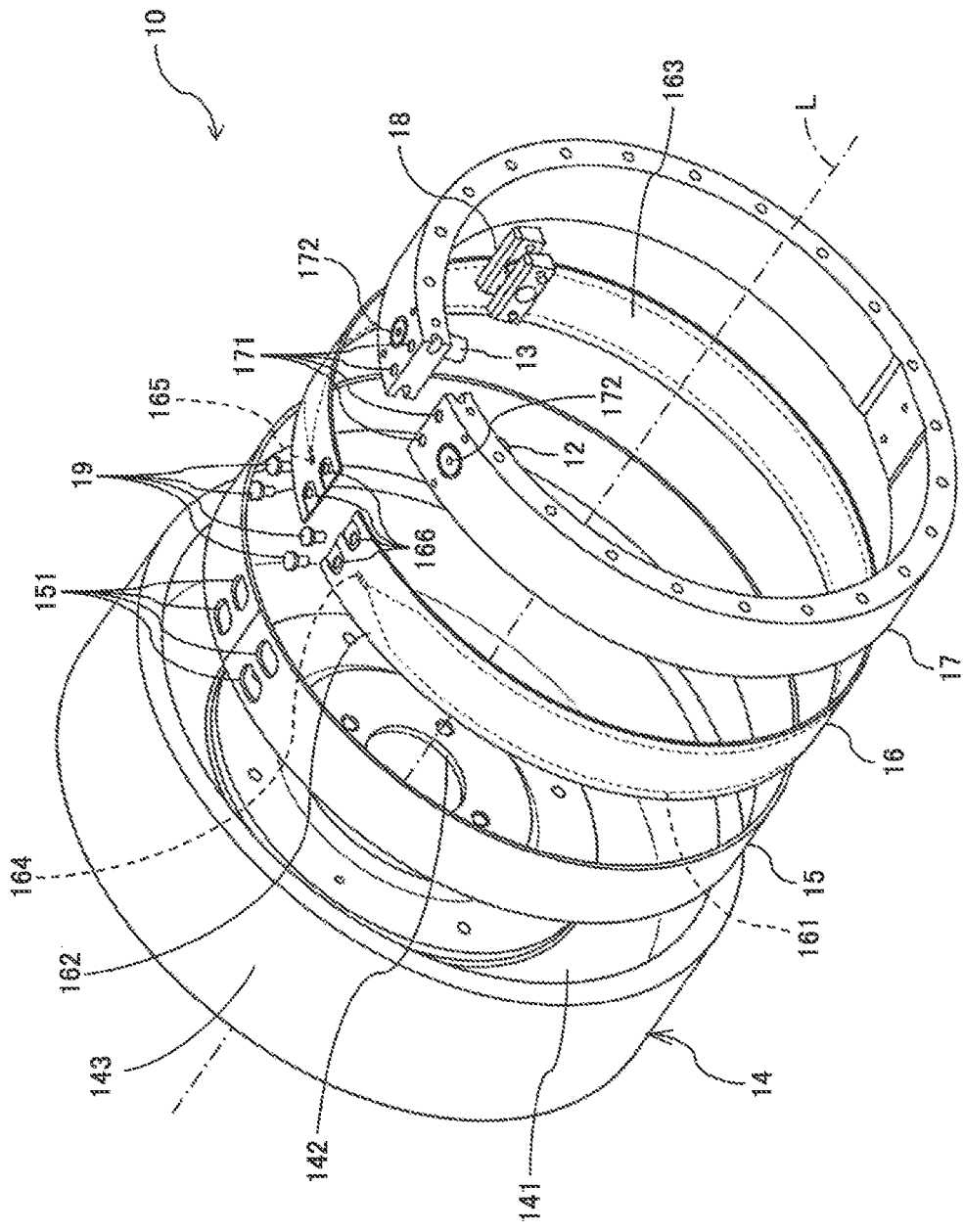
FIG. 3 is an exploded perspective view of a rotary unit of a centrifugal field-flow fractionation device provided in the analysis system according to Embodiment 1.

FIG. 3 is an exploded perspective view of a rotary unit of the centrifugal field-flow fractionation device provided in the analysis system according to Embodiment 1. Referring to FIG. 3, the rotary unit 10 of the centrifugal field-flow fractionation device 1 will be described.

As shown in FIG. 3, the rotary unit 10 is configured as a cylindrical member as a whole by assembling, for example, a rotor 14, a spacer 15, a flow path member 16, a fixing member 17, and a wedge-shaped member 18.

The rotor 14 has a bottomed cylindrical configuration. The rotor 14 has an end wall 141 and a side wall portion 143 extending along the rotation axis L from the periphery of the end wall 141. The side wall portion 143 has an annular shape.

The end wall 141 is formed in a disc shape and is provided at its central portion with an insertion hole 142 for inserting the rotary shaft 11. The rotary shaft 11 is fixed to the end wall 141 in a state of being inserted into the insertion hole 142. With this, as described above, it is possible to rotate the rotor 14 about the rotation axis L in accordance with the rotation of the rotary shaft 11.

In the space inside the rotor 14 (the inner side of the wall portion 143), the spacer 15, the flow path member 16, the fixing member 17, and the wedge-shaped member 18 are accommodated. The spacer 15, the flow path member 16, and the fixing member 17 each have a shape formed by bending elongated member in an arc shape. The spacer 15, the flow path member 16, and the fixing member 17 are fixed in a stacked state in this order along the inner peripheral surface of the rotor 14. The curvature radius of the spacer 15, that of the flow path member 16, and that of the fixing member 17 are each, for example, about 50 mm to 200 mm.

The flow path member 16 is provided along the inner peripheral surface (specifically, the inner peripheral surface of the side wall portion 143) of the rotor 14. The flow path member 16 is provided so that the liquid sample flows therethrough.

The flow path member 16 is, for example, a thin plate member having a thickness of 1 mm or less and is formed in a substantially C-shape in which both circumferential ends face with a space therebetween. In the flow path member 16, a flow path 161 extending in the circumferential direction is formed.

The flow path member 16 has an arc-shaped outer peripheral surface 162 formed on the side of the rotor 14 and an arc-shaped inner peripheral surface 163 formed on the side of the rotation axis L. The flow path 161 is formed between the outer peripheral surface 162 and the inner peripheral surface 163.

An inlet port 164 for a liquid sample to the flow path 161 is formed at one circumferential end of the inner peripheral surface 163 of the flow path member 16. An outlet port 165 for a liquid sample from the flow path 161 is formed at the other circumferential end of the inner peripheral surface 163 of the flow path member 16. The liquid sample flowing into the flow path 161 from the inlet port 164 is flowed out of the outlet port 165 through the flow path 161.

When classifying the particles in the liquid sample, the rotary unit 10 is rotated by driving the motor. The rotational rate of the rotary unit 10 is gradually increased to reach a predetermined value. The liquid sample is injected from the inlet port 164 in a state in which the rotational speed is maintained at a predetermined value.

After the liquid sample has been injected into the flow path 161 for a certain period of time, the supply of the liquid sample is stopped by switching the rotary valve 4. On the other hand, the rotary unit 10 maintains the rotating state, causing the particles in the liquid sample in the flow path 161 to be centrifugally precipitated. Thereafter, the rotary valve 4 is switched to resume the supply of the liquid sample, and the rotational rate of the rotary unit 10 is gradually lowered after a predetermined period of time has elapsed.

With this, in the order from the particle having a smaller specific gravity in the liquid sample, the particles are sent toward the downstream side in accordance with the flow of the liquid sample in the flow path 161 and sequentially flow out of the outlet port 165. Thus, the particles in the liquid sample in the flow path 161 are classified by the centrifugal force and flow out of the outlet port 165 at different timings in accordance with the specific gravity to be sent to the detector 6.

The fixing member 17 is a member having a thickness larger than that of the flow path member 16 and is formed to have a thickness of, for example, about 10 mm. The fixing member 17 is, similarly to the flow path member 16, formed in a substantially C-shape in which both circumferential end portions are opposed with a space therebetween. The circumferential length of the fixing member 17 approximately matches the circumferential length of the flow path member 16. The fixing member 17 is provided on the inner side (on the side of the rotation axis L) of the flow path member 16 along the inner peripheral surface 163 of the flow path member 16.

At both the circumferential ends of the fixing member 17, a plurality of screw holes 171 for screwing bolts 19, which are examples of locking tools, is formed. At both circumferential ends of the flow path member 16, a plurality of insertion holes 166 is formed at positions facing the respective screw holes 171 of the fixing member 17. With this, the flow path member 16 can be attached to the fixing member 17 by inserting the bolts 19 from the outside into the respective insertion holes 166 and screwing into the respective screw holes 171. However, the locking tool is not limited to the bolt 19 and may be configured by other members, such as, e.g., pins.

Further, at both the circumferential end portions of the fixing member 17, through-holes 172 are formed at positions facing the inlet port 164 and the outlet port 165 formed in the inner peripheral surface 163 of the flow path member 16. To the inner peripheral surface of the fixing member 17, the inlet 12 and the outlet 13 are attached to communicate with the respective through-holes. The liquid sample introduced from the inlet 12 flows from the inlet port 164 into the flow path 161 through the one through-hole 172, flows circumferentially through the flow path 161, and is then discharged from the outlet port 165 through the other through-hole 172 and the outlet 13.

The flow path 161 in the flow path member 16 is set to have a height depending on the type of the carrier fluid, the condition of the analysis, and the like. Therefore, the flow path member 16 is formed to have a different thickness according to the height of the flow path 161, the optimum flow path member 16 is selected from among the plurality of types of flow path members 16 and is attached to the fixing member 17.

The fixing member 17 attached to the flow path member 16 as described above is inserted into the space on the inner side of the rotor 14 and is fixed along the inner peripheral surface of the rotor 14 to sandwich the flow path member 16 between the fixing part and the rotor 14. At this time, by attaching the wedge-shaped member 18 between both ends of the substantially C-shaped fixing member 17, a force is applied in the direction of expanding both the ends.

With this, the C-shaped fixing member 17 is strongly pressed against the inner peripheral surface side of the rotor 14, so that the flow path member 16 is pressed against the rotor 14 to be fixed thereto. When classifying the particles in the liquid sample, the rotor 14 is rotated at high speed, resulting in high pressure (e.g., about 1 MPa) in the flow path 161, which increases the pressure difference between the inside of the flow path 161 and the outside thereof. In this embodiment, by sandwiching the flow path member 16 between the fixing member 17 and the rotor 14, it is possible to prevent the outer peripheral surface 162 and the inner peripheral surface 163 of the flow path member 16 from being deformed to a side opposite to the flow path 161 by the pressure difference.

In this embodiment, a spacer 15 is configured to be sandwiched between the flow path member 16 and the rotor 14. The material of the spacer 15 is not particularly limited but is made of resin or metal, such as, e.g., PET (Polyethylene Terephthalate). The spacer 15 is formed to be slightly longer than that of the flow path member 16. At both circumferential ends of the spacer 15, elongated holes 151 are formed at positions facing the respective insertion holes 166 of the flow path member 16.

The head of the bolt 19 inserted into each insertion hole 166 of the flow path member 16 is accommodated within each elongated hole 151 of the spacer 15. Each elongated hole 151 is formed to extend circumferentially.

In a state in which the head of each bolt 19 is accommodated in each elongated hole 151, both ends of the fixing member 17 are expanded by the wedge-shaped member 18 to thereby strongly press the fixing member 17 against the inner peripheral surface of the rotor 14. In this case, the spacer 15 and the flow path member 16 are sandwiched by and between the fixing member 17 and the rotor 14 while the heads of the respective bolts 19 slide circumferentially within the respective elongated holes 151.

The spacer 15 is a thin plate having a thickness of, e.g., 1 mm or less and is selected from a spacer having a thickness depending on the thickness of the flow path member 16. That is, a spacer 15 having an optimum thickness is selected so that the total value of the thickness of the spacer 15 and the thickness of the flow path member 16 become substantially constant. Further, the spacer 15 has a function of preventing damage to the inner peripheral surface of the rotor 14. Note that the spacer 15 may be omitted.

Figure 4:
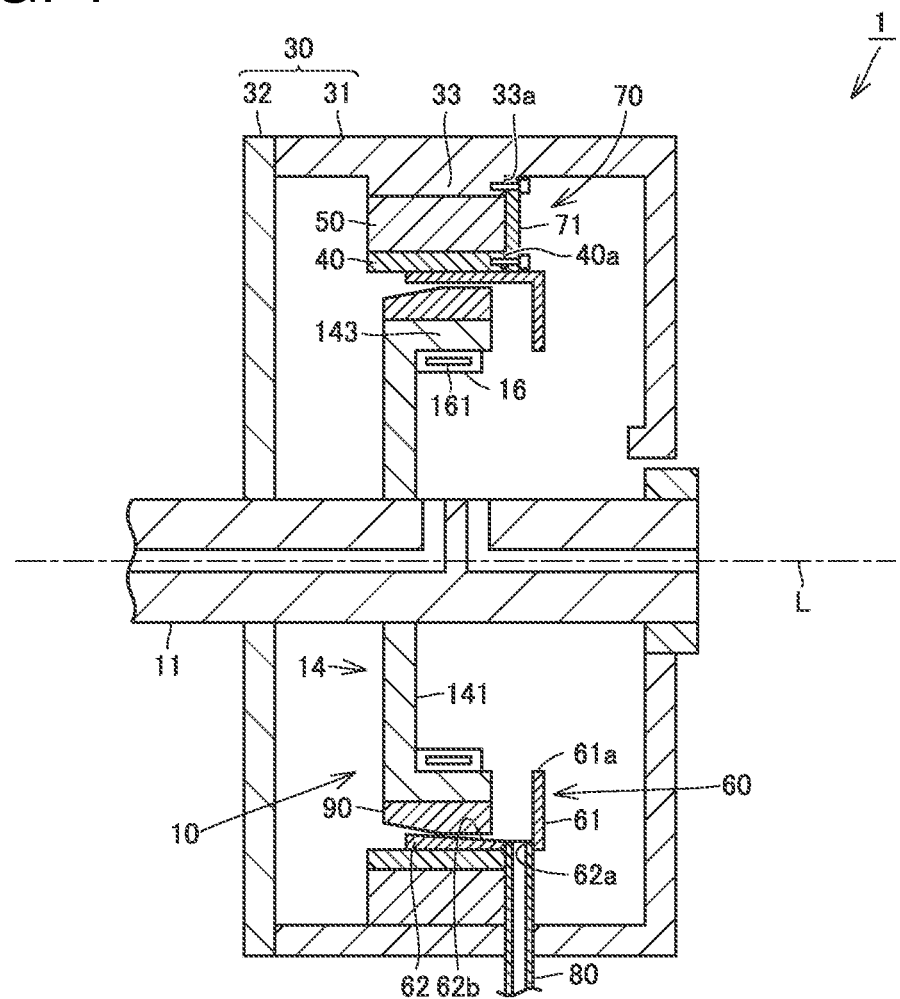
FIG. 4 is a schematic cross-sectional view of a centrifugal field-flow fractionation device according to Embodiment 1.

FIG. 4 is a schematic cross-sectional view of a centrifugal field-flow fractionation device according to Embodiment 1. Referring to FIGS. 2 and 4, the detailed configuration of the centrifugal field-flow fractionation device 1 will be described.

As shown in FIGS. 2 and 4, the cover 30 is provided to cover the rotary unit 10 (rotor 14). The cover 30 accommodates the rotor 14 therein. The cover 30 has a substantially box shape and is constituted by a metallic member, such as, e.g., stainless steel. Through the cover 30, the rotary shaft 11 penetrates in the horizontal direction.

The cover 30 is fixed to the base unit 21 of the housing 20. The cover 30 includes a main body 31, a closing member 32, and an installation portion 33. The main body 31 is provided to open on one side in the horizontal direction. The closing member 32 is provided so as to close the opening of the main body 31. The installation portion 33 is provided to the main body 31 and is provided to protrude vertically from the inner surface of the main body 31. The installation portion 33 is a portion for installing the outer peripheral portion of the shock-absorbing member 50. The installation portion 33 has a first end 33a in a direction parallel to the rotation axis L.

It should be noted that the installation portion 33 is not limited to the configuration protruding vertically from the inner surface of the main body 31 as described above. As long as the outer peripheral portion of the shock-absorbing member 50 can be brought into contact, it is possible to adopt an arbitrary configuration.

The protective member 40 is arranged on the inner side of the cover 30 and covers the rotor 14 about the rotation axis L. The protective member 40 is arranged on the radially outward side of the rotor 14. The protective member 40 has an annular shape and is spaced away from the rotor 14. More specifically, the protective member 40 is arranged away from the ring member 90 press-fitted onto the outer periphery of the rotor 14. The ring member 90 is made of a resinous material, such as, e.g., CFRP (Carbon Fiber Reinforced Plastics).

The protective member 40 has a second end 40a on the side where the first end 33a is located in the direction parallel to the rotation axis. The protective member 40 is formed of a metallic member.

The shock-absorbing member 50 is disposed between the protective member 40 and the cover 30. The shock-absorbing member 50 has an annular shape. The shock-absorbing member 50 is made of, for example, a plastic material, such as, e.g., polystyrene foam. The shock-absorbing member 50 is sandwiched between the cover 30 (more specifically, the installation portion 33) and the protective member 40.

In a case where a portion of the rotor 14 disintegrates and is brought into contact with the protective member 40 when the rotor 14 is rotating, the fixing part 70, which will be described later, is broken, which causes the shock-absorbing member 50 to be movable while receiving the impact of the rotor 14.

The fixing part 70 secures the protective member 40 to the cover 30. The fixing part 70 has a connection member 71 for connecting the first end 33a of the installation portion 33 and the second end 40a of the protective member 40. The connection member 71 is fastened to the first end 33a and the second end 40a with fastening members 72a and 72b.

A plurality of fixing parts 70 may be provided. In this case, a plurality of fixing parts 70 is spaced around the rotation axis L. With this, the protective member 40 can be stably fixed.

Each fixing part 70 is provided in a breakable manner. Each fixing part 70 is configured to be breakable when a part of the rotor 14 disintegrates and is brought into contact with the protective member 40 during the rotation of the rotor 14.

Generally, in a case where the inlet 12 or the outlet 13 is loosened or a gap is formed in the flow path member 16, the liquid sample may leak out of the flow path member 16. Here, in this embodiment, a leaked liquid recovery tray 60 for recovering the liquid sample leaked from the flow path member 16 is provided. Therefore, even in a case where the liquid sample leaks, it is possible to recover the liquid sample by the leaked liquid recovery tray 60 and prevent scattering of the liquid sample. The liquid sample may sometimes cause degradation of the shock-absorbing member 50. Therefore, by recovering the liquid sample with the leaked liquid recovery tray 60, it is possible to suppress the deterioration of the shock-absorbing member 50

The leaked liquid recovery tray 60 has a plate-like portion 61 having a disc shape and a peripheral wall 62. The plate-like portion 61 extends along a direction (specifically, the vertical direction) perpendicular to the rotation axis L. In the center of the plate-like portion 61, a through-hole 61a through which the rotary shaft 11 penetrates is provided. The peripheral wall 62 extends along the direction of the rotation axis L from the periphery of the plate-like portion 61.

The peripheral wall 62 is disposed between the protective member 40 and the rotor 14 (more specifically, the ring member 90) and covers the rotor 14 around the rotation axis L. The peripheral wall 62 is arranged away from the rotor 14.

Piping 80 for discharging the liquid sample leaked from the flow path member 16 is connected to the lower portion of the leaked liquid recovery tray 60. Specifically, the piping 80 is connected to the root portion of the peripheral wall 62 located near the plate-like portion 61.

On the lower side of the leaked liquid recovery tray 60, the inner peripheral surface 62b of the peripheral wall 62 has an inclined portion inclined toward the piping 80. With this, the leaked liquid recovered inside the peripheral wall 62 at the lower side of the liquid recovery tray 60 can be efficiently introduced into the piping 80.

The leaked liquid recovery tray 60 is secured to the cover 30 by a tray fixing part 75. The tray fixing part 75 has substantially the same configuration as the fixing part 70 described above. The tray fixing part 75 connects the first end 33a of the installation portion 33 and the plate-like portion 61 of the leaked liquid recovery tray 60 by a connection member 76. The connection member 76 is fastened to the first end 33a and the plate-like portion 61 with fastening members 77a and 77b. Like the fixing part 70, the tray fixing part 75 is provided in a breakable manner.

According to the above-described centrifugal field-flow fractionation device 1, even in a case where the rotation axis L of the rotor 14 is oriented horizontally, the protective member 40 and the shock-absorbing member 50 can be fixed so as not to touch the rotor 14 under normal conditions by using the fixing part 70 as described above.

Furthermore, in a case where a part of the rotor 14 disintegrates during the high-speed rotation of the rotor 14, the part of the rotor 14 collides against the protective member 40 in a state in which the kinetic energy is high while maintaining the rotating condition. At this time, the impact including the rotational force of the rotor 14 is inputted to the protective member 40. Here, the fixing part 70 for fixing the protective member 40 is provided in a breakable manner, and therefore, the fixing part 70 is broken by the impact inputted to the protective member 40. As a result, the protective member 40 and the shock-absorbing member 50 are moved due to the impact of the rotor 14. Specifically, the protective member 40 and the shock-absorbing member 50 rotate while being deformed due to the impact from the rotor 14.

When the protective member 40 and the shock-absorbing member 50 are deformed, the kinetic energy of the disintegrated rotor 14 is buffered (consumed). Therefore, even in a case where the rotor 14 pushes the protective member 40 and the shock-absorbing member 50 toward the cover 30, it is possible to suppress the damage to the cover 30.

Further, when the protective member 40 and the shock-absorbing member 50 are rotated, the rotational force of the disintegrated rotor 14 is also consumed, which prevents the direct input of the rotational force of the rotor 14 to the cover 30. In particular, in a case where the rotation axis L of the rotor 14 is oriented horizontally, the rotating force in the same direction as that of the rotation direction of the rotor 14 acts. Since such a rotational force can be prevented from being directly inputted to the cover 30, it is possible to prevent the overturning of the analysis system 100 to which the cover 30 is fixed.

As described above, in the above-described centrifugal field-flow fractionation device 1, the breakage of the cover 30 can be suppressed, and the overturning of the analysis system 100 provided with the device can be prevented, and therefore, the safety can be improved.

Furthermore, since the leaked liquid recovery tray 60 is provided around the rotor 14, in a case where the rotor 14 disintegrates due to the high-speed rotation, the impact of the rotor 14 can be absorbed also by the leaked liquid recovery tray 60.

Further, when the impact is inputted to the leaked liquid recovery tray 60, the tray fixing part 75 is broken, and therefore, the leaked liquid recovery tray 60 is also rotated by the rotational force of the rotor 14. This also allows the leaked liquid recovery tray 60 to consume the rotational force of the rotor 14, further preventing the overturning of the analysis system 100.

Embodiment 2

Figure 5:
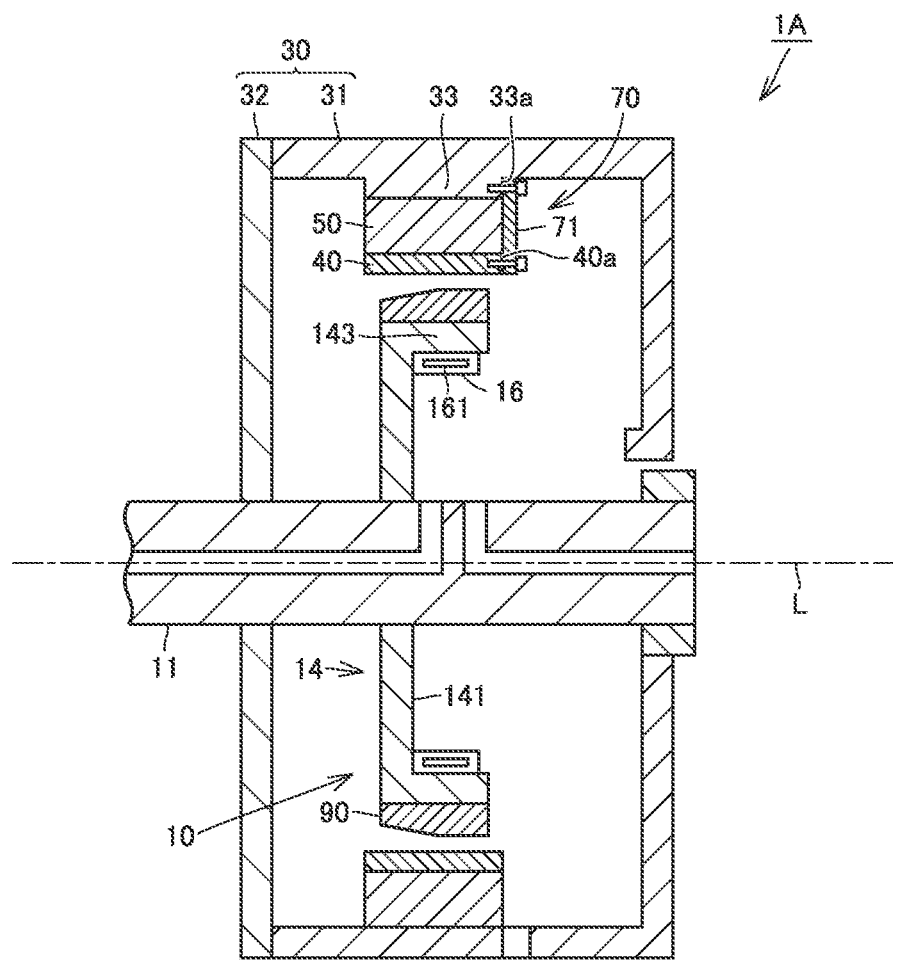
FIG. 5 is a schematic cross-sectional view of a centrifugal field-flow fractionation device according to Embodiment 2.

FIG. 5 is a schematic cross-sectional view of a centrifugal field-flow fractionation device according to Embodiment 2. Referring to FIG. 5, the centrifugal field-flow fractionation device 1A according to Embodiment 2 will be described.

As shown in FIG. 5, the centrifugal field-flow fractionation device 1A according to Embodiment 2 differs from the centrifugal field-flow fractionation device 1 of Embodiment 1 in that the leaked liquid recovery tray 60 is omitted, and the remaining configurations are substantially the same.

Even in such cases, substantially the same effects as those of the centrifugal field-flow fractionation device 1 according to Embodiment 1 can be obtained in the centrifugal field-flow fractionation device 1A according to Embodiment 2.

Embodiment 3

Figure 6:
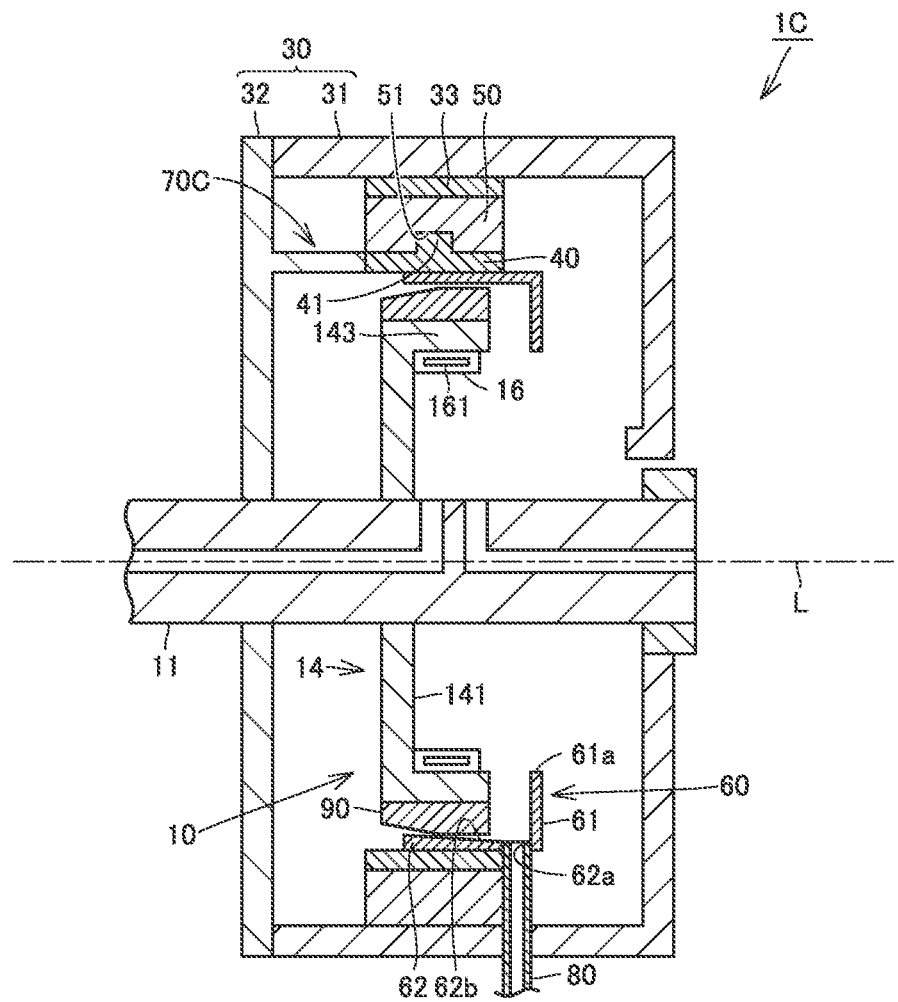
FIG. 6 is a schematic cross-sectional view of a centrifugal field-flow fractionation device according to Embodiment 3.

FIG. 6 is a schematic cross-sectional view of a centrifugal field-flow fractionation device according to Embodiment 3. Referring to FIG. 6, the centrifugal field-flow fractionation device 1C according to Embodiment 3 will be described.

As shown in FIG. 6, the centrifugal field-flow fractionation device 1C according to Embodiment 3 is mainly different in the configuration of the fixing part 70C when compared with the centrifugal field-flow fractionation device 1 according to Embodiment 1. The other configurations are substantially the same.

A fixing part 70C is provided to connect the inner surface of the cover 30 and the protective member 40. The fixing part 70C is provided, for example, to extend along a direction parallel to the rotation axis L.

Further, the protective member 40 is provided with an engaging portion 41. The engaging portion 41 is constituted by a protrusion projecting toward the shock-absorbing member 50. The shock-absorbing member 50 has a portion-to-be-engaged 51 engaged with an engaging portion 41. The portion-to-be-engaged 51 is constituted by a groove. By engaging the engaging portion 41 with the portion-to-be-engaged 51, it is possible to suppress the separation of the protective member 40 from the shock-absorbing member 50. Further, the positioning of the protective member 40 and/or the shock-absorbing member 50 in the direction of the rotation axis is also facilitated.

Although some examples have been described in which the engaging portion 41 is formed by a projection and the portion-to-be-engaged 51 is formed by a groove, the present invention is not limited thereto. The engaging portion 41 may be constituted by a groove, the portion-to-be-engaged 51 may be constituted by a projection that engages the groove.

Further, the installation portion 33 and the shock-absorbing member 50 may be provided with the same engaging portion and the same portion-to-be-engaged as described above. In this instance, the positioning of the shock-absorbing member 50 can be easily performed.

Even in the case of being configured as described above, substantially the same effects as those of the centrifugal field-flow fractionation device 1 according to Embodiment 1 can be obtained in the centrifugal field-flow fractionation device 1C according to Embodiment 3.

Note that, in the above-described Embodiment 3, an example has been exemplified in which the leaked liquid recovery tray 60 is provided, but the present invention is not limited thereto. The leaked liquid recovery tray 60 may be omitted.

Further, in Embodiments 1 and 3, an example has been described in which the leaked liquid recovery tray 60 is configured separately from the protective member 40, but the present invention is not limited thereto. The leaked liquid recovery tray 60 may be integrally formed with the protective member 40. In this instance, the tray fixing part can be omitted, and the number of components can be reduced.

[Appendix]

As discussed above, the present embodiments include the following disclosures.

[Configuration 1]

A centrifugal field-flow fractionation device comprising:
 a rotor having a rotation axis, the rotor being provided to be rotatable about the rotation axis;

a cover configured to cover the rotor;
a protective member arranged on an inner side of the cover, the protective member covering the rotor about the rotation axis;
a shock-absorbing member arranged between the protective member and the cover; and
a fixing part provided in a breakable manner, the fixing part fixing the protective member to the cover,
wherein the rotor is arranged such that the rotation axis orients in a horizontal direction, and
wherein in a case where a part of the rotor disintegrates and is brought into contact with the protective member during rotation of the rotor, the fixing part breaks to allow the protective member and the shock-absorbing member to be movable while receiving impact of the rotor to buffer kinetic energy of the rotor.

[Configuration 2]
The centrifugal field-flow fractionation device as recited in the above-described Configuration 1,
wherein the cover includes an installation portion for installing an outer peripheral portion of the shock-absorbing member,
wherein the installation portion has a first end in a direction parallel to the rotation axis,
wherein the protective member has a second end on a side where the first end is located in the direction parallel to the rotation axis, and
wherein the fixing part includes one or more connection members connecting the first end and the second end.

[Configuration 3]
The centrifugal field-flow fractionation device as recited in the above-described Configuration 1,
wherein the fixing part is provided to connect an inner surface of the cover and the protective member.

[Configuration 4]
The centrifugal field-flow fractionation device as cited in any one of the above-described Configurations 1 to 3, further comprising:
a flow path member provided along an inner peripheral surface of the rotor, the flow path member being configured to allow a liquid sample to flow therethrough; and
a leaked liquid recovery tray configured to collect the liquid sample leaking from the flow path member,
wherein the leaked liquid recovery tray is arranged between the protective member and the rotor, the leaked liquid recovery tray having a peripheral wall covering the rotor about the rotation axis.

[Configuration 5]
The centrifugal field-flow fractionation device as recited in the above-described Configuration 4, further comprising:
a tray fixing part configured to fix the leaked liquid recovery tray to the cover,
wherein the tray fixing part is provided so as to be broken in a case where a part of the rotor disintegrates and is brought into contact with the leaked liquid recovery tray during the rotation of the rotor.

[Configuration 6]
The centrifugal field-flow fractionation device as recited in the above-described Configuration 5,
wherein piping configured to discharge the collected leaked liquid is connected to a lower part of the leaked liquid recovery tray, and
wherein on a lower part side of the leaked liquid recovery tray, an inner peripheral surface of the peripheral wall of the leaked liquid recovery tray has an inclined portion inclined toward the piping.

[Configuration 7]
The centrifugal field-flow fractionation device as recited in the above-described Configuration 5 or 6,
wherein the leaked liquid recovery tray is integrally provided with the protective member.

The embodiments disclosed herein are illustrative in all respects and not restrictive. The scope of the present invention is indicated by claims, and includes all modifications within the meanings and ranges equivalent to those of the claims.

DESCRIPTION OF SYMBOLS 1, 1A, 1C: Centrifugal field-flow fractionation device
2: Carrier reservoir
3: Liquid feeding pump
4: Rotary valve
5: Sample injection device
6: Detector
7: Carrier recovery portion
10: Rotary unit
11: Rotary shaft
12: Inlet
13: Outlet
14: Rotor
15: Spacer
16: Flow path member
17: Fixing part
18: Wedge-shaped member
19: Bolt
20: Housing
21: Base portion
22: Upper side case
23: Holding unit
30: Cover
31: Main body
32: Closing member
33: Installation portion
33a: First end
40 Protective member
40a: Second end
41: Engaging portion
50: Shock-absorbing member
51: Portion to be engaged
60: Liquid recovery tray
61: Plate-like portion
61a: Through-hole
62: Peripheral wall
62b: Inner peripheral surface
70, 70C: Fixing part
71, 76: Connection member
72a, 72b, 77a, 77b: Fastening members
75: Tray fixing part
80: Piping
90: Ring member
100: Analysis system
141: End wall
142: Insertion hole
143: Side wall portion
151: Elongated hole
161: Flow path
162: Outer peripheral surface
163: Inner peripheral surface
164: Inlet port
165: Outlet port
166: Insertion hole
171: Screw hole 172: Through-hole
L: Rotation shaft

The invention claimed is:

1. A centrifugal field-flow fractionation device comprising:
 a rotor having a rotation axis, the rotor being provided to be rotatable about the rotation axis;
 a cover configured to cover the rotor;
 a protective member arranged on an inner side of the cover, the protective member covering the rotor about the rotation axis;
 a shock-absorbing member arranged between the protective member and the cover; and
 a fixing part provided in a breakable manner, the fixing part fixing the protective member to the cover,
 wherein the rotor is arranged such that the rotation axis orients in a horizontal direction, and
 wherein in a case where a portion of the rotor disintegrates and is brought into contact with the protective member during a rotation of the rotor, the fixing part breaks to allow the protective member and the shock-absorbing member to be movable together with the rotor while receiving impact of the rotor to buffer kinetic energy of the rotor.

2. The centrifugal field-flow fractionation device as recited in claim 1,
 wherein the cover includes an installation portion for installing an outer peripheral portion of the shock-absorbing member,
 wherein the installation portion has a first end in a direction parallel to the rotation axis,
 wherein the protective member has a second end on a side where the first end is located in the direction parallel to the rotation axis, and
 wherein the fixing part includes one or more connection members connecting the first end and the second end.

3. The centrifugal field-flow fractionation device as recited in claim 1,
 wherein the fixing part is provided to connect an inner surface of the cover and the protective member.

4. The centrifugal field-flow fractionation device as recited in claim 1, further comprising:
 a flow path member provided along an inner peripheral surface of the rotor, the flow path member being configured to allow a liquid sample to flow therethrough; and
 a leaked liquid recovery tray configured to recover the liquid sample leaking from the flow path member,
 wherein the leaked liquid recovery tray is arranged between the protective member and the rotor, the leaked liquid recovery tray having a peripheral wall covering the rotor about the rotation axis.

5. The centrifugal field-flow fractionation device as cited in claim 4, further comprising:
 a tray fixing part configured to fix the leaked liquid recovery tray to the cover,
 wherein the tray fixing part is provided so as to be broken in a case where a part of the rotor disintegrates and is brought into contact with the leaked liquid recovery tray during the rotation of the rotor.

6. The centrifugal field-flow fractionation device as recited in claim 4,
 wherein piping configured to discharge the recovered leaked liquid is connected to a lower part of the leaked liquid recovery tray, and
 wherein on a lower part side of the leaked liquid recovery tray, an inner peripheral surface of the peripheral wall of the leaked liquid recovery tray has an inclined portion inclined toward the piping.

7. The centrifugal field-flow fractionation device as recited in claim 4,
 wherein the leaked liquid recovery tray is integrally provided with the protective member.

* * * * *